United States Patent
Corbett et al.

(10) Patent No.: US 11,237,094 B2
(45) Date of Patent: Feb. 1, 2022

(54) PARTICLE SIZING BY OPTICAL DIFFRACTION

(71) Applicant: Malvern Panalytical Limited, Malvern (GB)

(72) Inventors: Jason Corbett, Malvern (GB); Rhys Poolman, Malvern (GB)

(73) Assignee: Malvern Panalytical Limited, Malvern (GB)

( * ) Notice: Subject to any disclaimer, the term of this patent is extended or adjusted under 35 U.S.C. 154(b) by 0 days.

(21) Appl. No.: 16/978,474

(22) PCT Filed: Mar. 5, 2019

(86) PCT No.: PCT/GB2019/050610
§ 371 (c)(1),
(2) Date: Sep. 4, 2020

(87) PCT Pub. No.: WO2019/171044
PCT Pub. Date: Sep. 12, 2019

(65) Prior Publication Data
US 2021/0164884 A1 Jun. 3, 2021

(30) Foreign Application Priority Data
Mar. 5, 2018 (GB) ........................... 1803523

(51) Int. Cl.
*G01N 15/14* (2006.01)
*G01N 15/10* (2006.01)

(52) U.S. Cl.
CPC . *G01N 15/1434* (2013.01); *G01N 2015/1087* (2013.01); *G01N 2015/1493* (2013.01)

(58) Field of Classification Search
CPC ....... G01N 15/1434; G01N 2015/1087; G01N 2015/1493; G01N 15/0211; G01N 2015/1454
See application file for complete search history.

(56) References Cited

U.S. PATENT DOCUMENTS 4,329,054 A * 5/1982 Bachalo ............. G01N 15/0205
356/336
4,540,283 A * 9/1985 Bachalo ............. G01N 15/0205
356/28.5
(Continued)

FOREIGN PATENT DOCUMENTS

EP 0167272 A2 1/1986
EP 1721144 B1 9/2007

OTHER PUBLICATIONS

Berne et al. (2000). Dynamic Light Scattering: With Applications to Chemistry, Biology, and Physics. A Wiley-Interscience Publication, 375 pages.
(Continued)

*Primary Examiner* — Roy M Punnoose
(74) *Attorney, Agent, or Firm* — Morrison & Foerster LLP (57) ABSTRACT

A particle-sizing instrument is provided, comprising: a sample cell for receiving a sample comprising a plurality of particles; a light source configured to illuminate the sample with a light beam to produce scattered light by the interaction of the light beam with the particles; a first optical system comprising a first and second optical element respectively configured to split a portion of the scattered light into a first and second portion of scattered light: a second optical system configured to receive the first and second portion of scattered light from the first optical system, and to recombine the first and second portion of scattered light to produce an interference signal at a detection location, and a detector configured to detect the interference signal at the detection location.

20 Claims, 5 Drawing Sheets

(56) References Cited

U.S. PATENT DOCUMENTS 4,986,659 A * 1/1991 Bachalo ............ G01N 15/0205
356/336
2008/0218738 A1 9/2008 Trainer

OTHER PUBLICATIONS

International Search Report and Written Opinion dated Jun. 26, 2019, directed to International Application No. PCT/GB2019/050610; 9 pages.
Wiscombe (Aug. 1996 reprint of Jun. 1979 paper) "Mie Scattering Calculations: Advances in Technique and Fast Vector-Speed Computer Codes," NCAR Mie Report; 64 pages.

* cited by examiner

PARTICLE SIZING BY OPTICAL DIFFRACTION

CROSS-REFERENCE TO RELATED APPLICATIONS

This application is a national stage application under 35 USC 371 of International Application No. PCT/GB2019/050610, filed Mar. 5, 2019, which claims the priority of GB Application No. 1803523.8, filed Mar. 5, 2018, the entire contents of each of which are incorporated herein by reference.

FIELD OF THE DISCLOSURE

The present invention relates to an instrument and a method for optically determining particle size, more particularly by detecting a pattern of scattered light from the particles.

BACKGROUND OF THE DISCLOSURE

Diffraction based particle sized measurement is a widely used technique to characterise particles from a few millimetres in size to sub-micron. A monochromatic light source (e.g. a laser) is used to illuminate a sample comprising particles suspended in a fluid, entrained in a flowing air stream, falling gravitationally or held static on an optically clear surface, such as a flat plate, with a beam of light. Larger particles scatter light at small angles to the illuminating beam, and smaller particles scatter light at larger angles (more isotropically).

The intensity of scattered light at a range of scattering angles may be detected. This diffraction pattern may be inverted using Mie scattering theory to determine the size of the particles responsible for creating the scattering pattern. The particle size (or particle size distribution) determined in this way is typically the volume equivalent spherical diameter.

A lower limit for particle size exists, at which the scattering from particles is sufficiently close to isotropic that it becomes very difficult to distinguish different sizes of small particle. This lower limit may be referred to as the Rayleigh limit, in which the mean particle size is less than approximately 1/10 of the wavelength of the illuminating light beam. Near to and below this limit, particles scatter the incident light beam almost isotropically across the detector, which makes it very difficult to distinguish similarly sized small particles (because the scattering pattern is so similar for similarly small particles).

A solution to at least some of the above mentioned problems is desirable.

SUMMARY OF THE DISCLOSURE

According to a first aspect of the invention, there is provided a particle-sizing instrument comprising:
a sample cell for receiving a sample comprising a plurality of particles;
a light source configured to illuminate the sample with a light beam to produce scattered light by the interaction of the light beam with the particles;
a first optical system comprising a first and second optical element respectively configured to split a portion of the scattered light into a first and second portion of scattered light;

a second optical system configured to receive the first and second portion of scattered light from the first optical system, and to recombine the first and second portion of scattered light to produce an interference signal at a detection location,
a detector configured to detect the interference signal at the detection location.

The instrument may further comprise an optical path adjuster, for varying a first optical path taken by the first portion of scattered light to the detector, relative to a second optical path taken by the second portion of scattered light to the detector, so as to vary the interference signal at the detection location.

The optical path adjuster may be configured to adjust a position of the first optical element relative to a position of the second optical element. At least one of the first and second optical elements may be mounted on a motorised stage (e.g. to translate, and/or rotate the respective optical element(s) with at least one degree of freedom).

The optical path adjuster may be configured to adjust an optical path length for the first portion of scattered light (e.g. to the second optical system), relative to an optical path length for the second portion of scattered light.

The optical path adjuster may comprise a piezoelectric actuator operable to adjust optical path length.

The first optical element may comprise an input aperture of a first optical fibre, and the second optical element may comprise an input aperture of a second optical fibre.

The second optical system may comprise a coupler for joining the first and second optical fibres, so as to combine the first and second portions of scattered light within a third optical fibre.

The detector may comprise a photon-counting device, such as an avalanche photodiode (APD). The detector may comprise a single-photon detector (SPD) element. The detector may comprise a photomultiplier tube (PMT). The detector may comprise a transition-edge sensor (TES).

The detector may comprise an array of detector elements arranged in a detector focal plane.

The first element of the first optical system may be configured to receive a first portion of the scattered light and to modify the convergence of the first portion of scattered light communicated to the second optical system. The second element of the first optical system may be configured to receive a second portion of the scattered light and to modify the convergence of the second portion of scattered light communicated to the second optical system.

The first and second element may each comprise a converging refractive lens element.

The first and second element may be symmetric about the illuminating light beam.

The second optical system may comprise a converging refractive lens element with a focal plane that is co-incident with the detection location (or detection focal plane, for a focal plane array detector).

The instrument may comprise a processor configured to receive measurement data from the detector indicative of the interference signal at the detection location, and to determine a particle size and/or a particle size distribution from the measurement data.

Determining particle size may comprise using an inverted scattering matrix obtained according to Mie scattering theory, the inverted scattering matrix relating an intensity of scattered light at a plurality of different scattering angles to a frequency of particles at a plurality of different sizes (i.e. a particle size distribution).

Determining particle size may comprise obtaining an inversion matrix from a combination of an inverted scattering matrix and an optics matrix, the optics matrix representing the transformation of the scattered light by the first and second optical system.

The light source may comprise a laser or an LED. The light source may be coherent. The light source may have a degree of coherence necessary for conducting dynamic light scattering (DLS) experiments, as set out in, for example, "Dynamic Light Scattering: With Applications to Chemistry, Biology, and Physics", Berne, B. J., Pecora, R., Dover (2000).

The instrument may be configurable to function as either an interferometer or a conventional non-interferometric light scattering instrument by moving at least some elements of the first and/or second optical system into and out of the optical path of scattered light between the sample and the detector.

According to a second aspect, there is provided a method of obtaining a particle size or particle size distribution from a sample comprising particles, comprising:

illuminating the sample with a light beam, thereby producing scattered light from the interaction of the light beam with the particles;

splitting a portion of the scattered light into a first and second portion of scattered light;

recombining the first and second portion of scattered light at a detection focal plane to produce an interference pattern at the detection focal plane;

detecting the interference pattern at the focal plane;

processing the detected interference pattern to determine a particle size or particle size distribution.

According to a second aspect, there is provided a method of obtaining a particle size or particle size distribution from a sample comprising particles, comprising:

illuminating the sample with a light beam, thereby producing scattered light from the interaction of the light beam with the particles;

splitting a portion of the scattered light into a first and second portion of scattered light;

recombining the first and second portion of scattered light at a detection focal plane to produce an interference pattern at the detection focal plane;

detecting the interference pattern at the focal plane;

processing the detected interference pattern to determine a particle size or particle size distribution.

The sample may comprise at least one of: particles suspended in a fluid, particles entrained in a flowing air stream, particles falling gravitationally, and particles held static on an optically clear surface, such as a flat plate.

The splitting may be performed by a first optical system comprising:

a first element configured to define a first aperture corresponding with the first portion of the scattered light;

a second element configured to define a second aperture corresponding with the second portion of the scattered light.

The first optical element may comprise an input aperture of a first optical fibre, and the second optical element may comprise an input aperture of a second optical fibre; and/or the first optical element may comprise a first refracting converging lens; and the second optical element may comprise a second refracting converging lens.

The method of the second aspect may be performed using the instrument according to the first aspect, including any of the optional features thereof.

According to a third aspect, there is provided a machine readable medium, configured with software that, when run on a suitably configured processor, will cause the processor to determine a particle size or particle size distribution by processing an interference signal that is: obtained from an instrument according to the first aspect, or obtained according to the method according to the second aspect.

Features (including optional features) of each aspect may be combined with those of any other aspect.

BRIEF DESCRIPTION OF THE FIGURES

Embodiments will now be described, purely by way of example, with reference to the accompanying drawings, in which.

DETAILED DESCRIPTION OF THE DISCLOSURE

Figure 1:
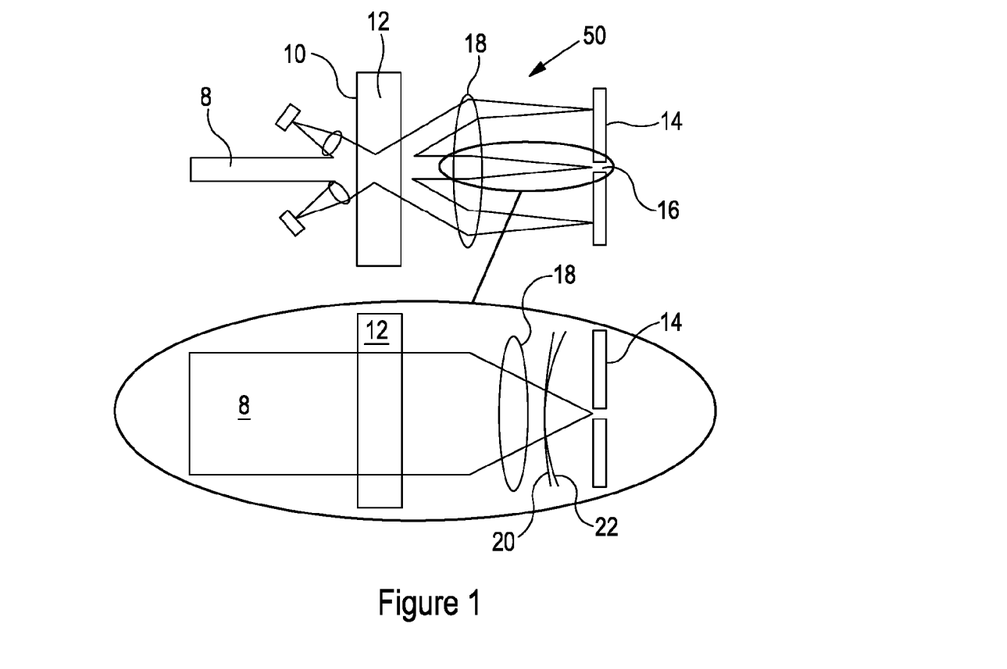
FIG. 1 is a schematic illustration of a non-interferometric particle sizing arrangement, illustrating the similar distribution of scattered light at the detector for two particles with a similar particle size, near to the Rayleigh limit.

Referring to FIG. 1, a schematic of a prior art particle sizing instrument is shown in which particle size is inferred by measuring the intensity of scattered light at a plurality of different scattering angles, and then using Mie scattering theory to determine a size distribution that is consistent with the distribution of scattered light at the various angles.

The instrument comprises a sample cell 10, containing a sample 12. The sample 12 comprises particles dispersed in a fluid (which may a liquid, such as water, or a gas, such as air). A light source (not shown) produces a light beam 8 which illuminates the sample 12, causing light to scatter from the particles. A portion of the light scattered in the forward direction (i.e. having a propagation direction with a component in the same direction as that in which the illuminating light beam propagates) is collected by a refracting lens 18, and focussed at a detection plane. A focal plane array detector 14 is disposed at the detection plane, and detects a distribution of scattered light intensity at a range of different scattering angles. Such an instrument may further comprise at least one additional detector for detecting back-scattered light (i.e. having a propagation direction with a component in the opposite direction to the direction of propagation of the illuminating light beam 8). The detector 14 comprises a through hole for the illuminating light beam 8 to pass through (e.g. to a beam trap), so that only scattered light is detected.

The particle sizing instrument may comprise other light focussing optics, as an alternative to or in addition to the refractive element, such as a reflective element. The reflective element may, for example, be a mirror or a plurality of mirrors, which may be positioned off-axis. The particle sizing instrument may comprise folded optics.

For two similar (but different) particle sizes that are near to the Rayleigh limit, similar scattering patterns are seen at the detector 14. This is schematically illustrated in FIG. 1, which shows a first scattering pattern 20 from a first sample with particles near the Rayleigh limit, and a second scattering pattern 22 from a second sample with slightly larger particles (also near the Rayleigh limit). The scattering in both cases is nearly isotropic, but is slightly more isotropic for the first sample (relative to the second). This small difference in intensity at the various detection angles may be difficult to distinguish, especially when noise is taken into account (e.g. optical noise and/or electrical/readout noise). Small particles are therefore difficult to precisely analyse with instruments that invert scattered light intensity at a range of different scattering angles to determine a particle size or particle size distribution (e.g. using Mie theory).

Figure 2:
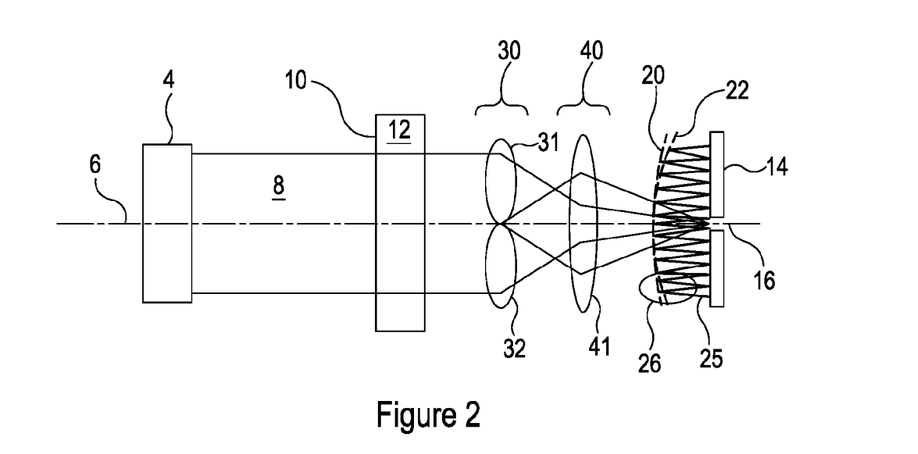
FIG. 2 is a schematic illustration of an interferometric particle sizing arrangement, in which scattered light is split into a first and second portion by a first and second lens element, and then recombined at a detector focal plane by a third lens element.

FIG. 2 is a schematic of an instrument according to an embodiment, comprising a light source 4, sample holder 10, first optical system 30, second optical system 40 and detector 14.

The light source 4 may be a laser, producing monochromatic coherent light, or an LED. The light source 4 is configured to produce a light beam 8, which propagates through the sample 12 along a light beam axis 6. The sample holder (or cell) 10 contains a sample 12 that comprises particles dispersed in a fluid (e.g. a liquid or gas). The light beam 8 is scattered by the particles to produce scattered light.

The first optical system 30 comprises a first optical element 31 and a second optical element 32, defining sampling apertures that split scattered light into a first and second portion. In this example the first and second optical elements 31, 32 both comprise converging refractive optical lenses, but in other embodiments multiple lens elements may be used to collect either of the first and second portion of scattered light, and reflective elements may be used instead of refractive elements. In some embodiments, a combination of refractive and reflective elements (and/or other optical elements) may be used to sample the scattered light of the first and/or second portion of scattered light.

In this embodiment, the first and second optical elements 31, 32 are arranged symmetrically about the light beam axis 6, but this need not be the case. An asymmetric pattern could also be used. In this embodiment, the converging refractive optical lenses are each oriented with their axis parallel to the light beam axis 6, but this also need not be the case.

In addition to receiving the first and second portion of scattered light, the first and second optical element 31, 32 may also receive at least part of the illumination beam 8 (as depicted in FIG. 2).

The light received by the first optical system 30 is directed to the second optical system 40. The second optical system 40 causes the scattered light to be recombined at a detection location to produce an interference signal from the constructive or destructive interference of the first and second portion of scattered light. In this embodiment the second optical system 40 comprises a focussing lens that produces an interference pattern of fringes from the interference of the first and second portion of scattered light at a detector focal plane. The second optical system 40 may define a detection axis, which is co-incident with an optical axis of the second optical system 40. The detection axis in the example embodiment of FIG. 2 is co-linear with the illumination axis 6, but this is not essential (the detection axis may be at a non-zero angle to the illumination axis 6).

Due to the split first optical system, at each detection location the optical path length for light scattered at a particular angle from the sample is different for the first portion compared to the second portion. This results in optical fringes at the detector. The portion of the illumination beam that is received by both the first and second optical element is focussed at the same point at the detection focal plane. In this example the illumination beam is focussed at a location co-incident with optical axis 6.

The detector 14 in this embodiment is a focal plane array detector, comprising a plurality of detection elements at a number of different locations in the detector focal plane. A gap or hole 16 is provided in the detector 14 to allow the illumination beam 8 to bypass the detector 14 (e.g. to be received at a beam trap). This allows the relatively small amount of scattered light to be more easily detected.

FIG. 2 illustrates a pattern of interference 25 at the detector 14. This can be contrasted with distributions of scattered light 20, 22 at the detector that would result from a prior art, non-interferometric, instrument.

Figure 3:
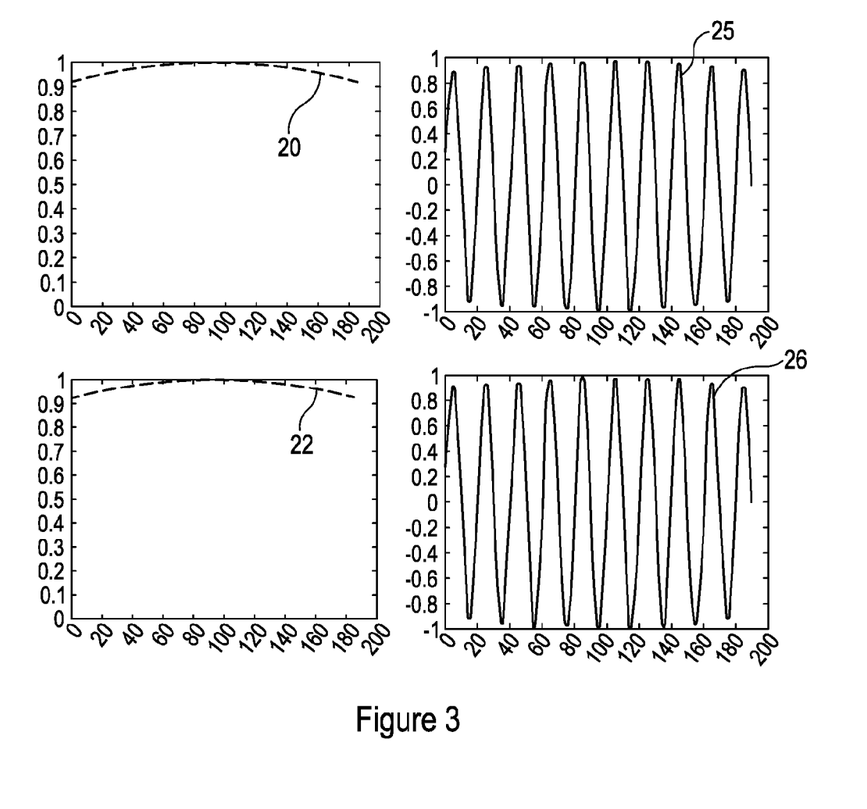
FIG. 3 is a set of graphs comparing measurement data obtained from a prior art diffraction instrument for similar samples near the Rayleigh limit and an interferometric measurement according to an embodiment on the same similar samples.

FIG. 3 illustrates this difference for a pair of samples with similar particle size near to the Rayleigh limit. The top row of graphs corresponds with scattering and interference patterns 20, 25 from a first sample, and the second row of graphs corresponds with scattering and interference patterns 22, 26 from a second sample. The left column of graphs corresponds with the pattern of scattered light 20, 22 obtained from a non-interferometric instrument, and the right column of graphs corresponds with an interference pattern 25, 26 at the detector. Each graph shows normalised intensity of scattered light (on the y axis) as a function of detection location, with each detection location corresponding with a particular scattering angle (shown on the x axis, with 90 corresponding with light scattered parallel with the illumination beam axis 6, and successive numerals indicating locations corresponding with the indicated angle).

A difference in particle size results in a change in the spacing of the optical fringes. The optical fringes in the interference pattern 25 have a different spacing than the fringes in the interference pattern 26. The difference in the spacing of the optical fringes in the interference pattern 25 and the optical fringes in the interference pattern 26 may become apparent during the numerical analysis of the interference patterns as illustrated in FIG. 4.

Figure 4:
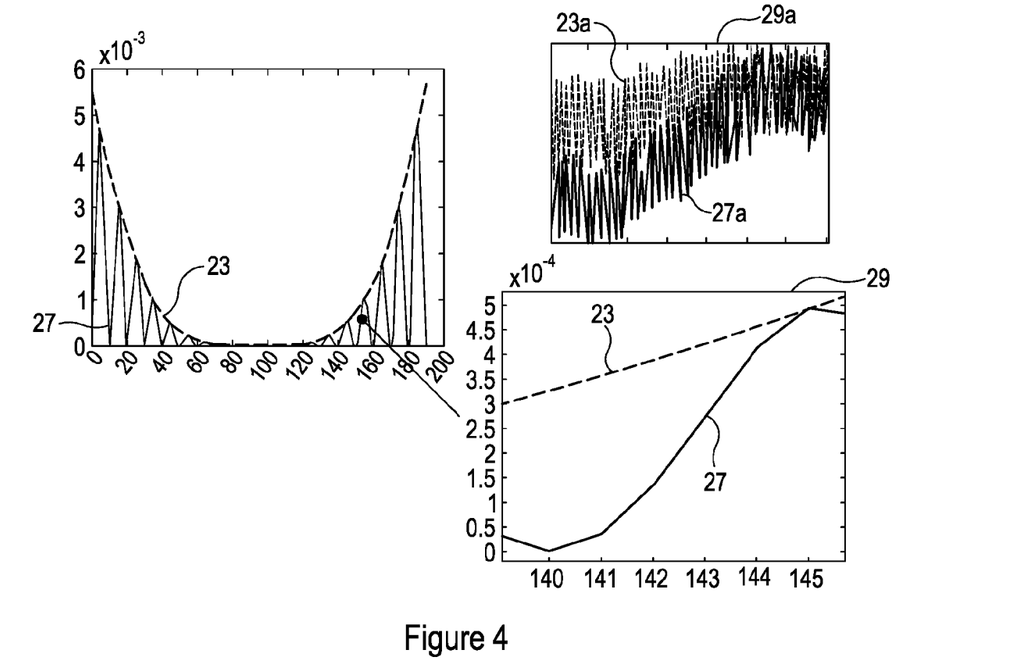
FIG. 4 is a set of graphs illustrating how the differences between interference patterns for particles with similar sizes near to the Rayleigh limit can be more readily distinguished using interferometric measurements, especially when noise is taken into account.

FIG. 4 illustrates the difference between scattering patterns according to the prior art (non-interferometric) and using an interferometer according to an embodiment. In the leftmost graph, dotted line 23 corresponds with the difference between scattered patterns 20, 22 from FIG. 3, and solid line 27 corresponds with the difference between interference patterns 25 and 26 from FIG. 3. The difference 27 between similar interference patterns 25, 26 can more easily be characterised than the difference 23 between similar scattering patterns 20, 22. This is more clearly shown in graph 29, which shows a smaller subset of the scattering angles shown in the leftmost graph. This is more pronounced when noise is taken into consideration, as shown in the top right graph 29a of FIG. 4.

Two similar interference patterns can more easily be discriminated than two similar scattering patterns. This is equivalent to improving the signal to noise ratio at the detector, which improves the ability of the instrument to analyse small particles. This in turn may be used to provide improved resolution of particle size (or particle size distribution), improve accuracy of particle sizing (particularly for smaller particles), and/or a larger range of particle size characterisation (e.g. extending the minimum size that can be characterised).

The first and second element of the first optical system define a first and second sampling aperture for the scattered light. In some embodiments, the sampling apertures may be adjustable, for example via an adjustment mechanism responsive to a control signal (such as a motorised stage). For example, a spacing between the first and second sampling aperture may be adjustable by moving at least one of the first or second optical elements relative to the other. Alternatively or in addition, the shape of at least one of the sampling apertures may be adjustable. Alternatively or additionally, the optical path length (to recombination at the detector) for the first portion of scattered light may be adjustable, relative to the second portion of scattered light. This may adjust the phase of the first portion of scattered light at recombination (relative to the phase of the second portion of scattered light).

In some embodiments, the first optical system may be coupled to an actuator that is operable to remove the first optical system from the path of scattered light to the detector so that the instrument is reconfigured as a conventional non-interferometric particle sizing instrument, and to insert the first optical system to reconfigure a conventional diffraction based particle sizing instrument into an interferometric instrument.

The control of the configuration of the first and/or second optical system may be automatic, and responsive to measurement data obtained by the instrument. The configuration of the first optical system may be adjusted during a measurement in response to changing or trending sample conditions. An example application for this is continuous process monitoring, for example of dry particles suspended in air. More generally, an instrument may be reconfigured to use interferometry to improve signal-to-noise ratio at particular detection angles that are coincident with Mie-scattering minima of the sample being measured.

Figure 5A:
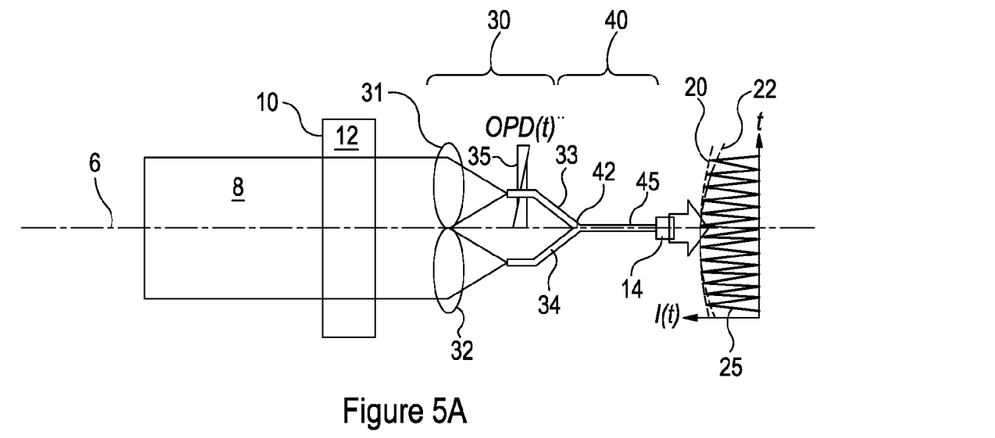
FIG. 5A is a schematic illustration, from a first viewing direction, of an interferometric particle sizing arrangement according to an alternative embodiment, in which scattered light is split into a first and second portion, which are respectively coupled into a first and second optical fibre, and then recombined at a fibre coupler before being directed to a single detector element.
Figure 5B:
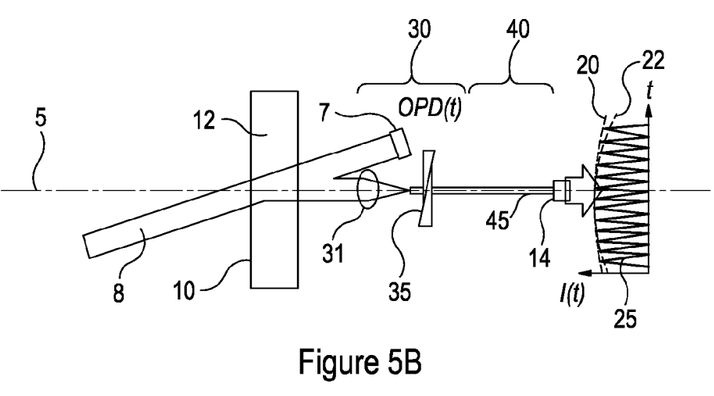
FIG. 5B is a schematic illustration of the interferometric particle sizing arrangement of FIG. 5A, from a second viewing direction, orthogonal to the first viewing direction.

FIGS. 5A and 5B show an alternative embodiment in which the illumination and sample holder are configured in the same way as the embodiment of FIG. 2. FIG. 5A is a schematic illustration of the interferometric particle sizing arrangement from a first viewing direction (e.g. side), and FIG. 5B is a schematic illustration of the interferometric arrangement from a second viewing direction (e.g. plan), wherein the first view and second view are orthogonal to each other. In this embodiment the first and second element 31, 32 of the first optical system 30 again each comprise refracting lenses. The refracting lens of the first and second element 31, 32 respectively couple scattered light into a first and second optical fibre 33, 34, so that the first optical system 30 (defining the sampling aperture for the first portion and second portion of scattered light) includes the input aperture of the optical fibres 33, 34. An optical path length adjuster 35 is included in the first optical fibre.

The axes of the first and second element 31, 32 may be parallel. The first element axis 5 is depicted in FIG. 5B. From the viewing direction of FIG. 5B, the axis of the first and second element appear to be coincident, but they are offset (as shown in FIG. 5A). The axes of the first and second element 31, 32 are each at a non-zero angle to the light beam 8 and light beam axis 6, as shown in FIG. 5B. A significant proportion of the light beam 8 entering the sample may be substantially undeviated after passing through the sample. The light beam exiting the sample may be received at an optical beam dump 7, which prevents it from reflecting/scattering and contributing to optical noise.[[.]] The first and second element 31, 32 are configured to collect only scattered light for detection. The optical beam dump 7 shown in FIG. 5B is omitted from FIG. 5A for clarity.

The optical stability of optical fibre 34 may not always be guaranteed in a varying thermal environment, or where the fibre moves during the measurement. For this reason, optical path length adjusters may be fitted in both the optical branch comprising optical fibre 33 and the optical branch comprising optical fibre 34, allowing more precise control of the optical path difference between the two optical branches.

The second optical system 40 comprises a coupler 42 and a third optical fibre 45. The first and second optical fibres are connected to the coupler 42, which re-combines the first and second portion of scattered light into a third optical fibre 45. The third optical fibre 45 couples the combined scattered light onto a detector 14, which may be a single detector element such as an avalanche photodiode.

Adjustment of the optical path length difference OPD for the first portion of scattered light compared to the second portion of scattered light will adjust the relative phase of the first portion and second portion when they are recombined. Adjustment of the phase of the first portion of scattered light relative to the second portion will therefore scan the interference pattern across the detector element 14, thereby enabling a point detector to sample a range of effective scattering angles.

This may be advantageous, because an avalanche photodiode (APD) may have a higher quantum efficiency (e.g. 80-90% in the wavelength range 400 nm-700 nm) than a photodiode, charge coupled device or active pixel sensor, but may be prohibitively expensive to use for more than a few scattering angles (e.g. in an array, or detecting more than two or three scattering angles). Adjustment of a path length may be more straightforward than adjustment of a scattering angle by scanning a detector through a range of angles. Optical modulators (e.g. based on piezoelectric devices) can operate quickly (e.g. >1 kHz, or >10 kHz) and are therefore operable to capture a diffraction pattern in timescales that are comparable with modern sample presentation schemes, such as fluid-based recirculating cells, and in particular for one-shot air based schemes.

In some embodiments, a focal plane array detector (e.g. comprising CMOS photosensors) may be combined with at least one APD detector. The APD detector may be positioned at a location associated with a particular detection angle, for instance for applications in which an important Mie scattering minima needs to be monitored, for instance in an application with a fixed (target) particle size distribution.

Figure 6:
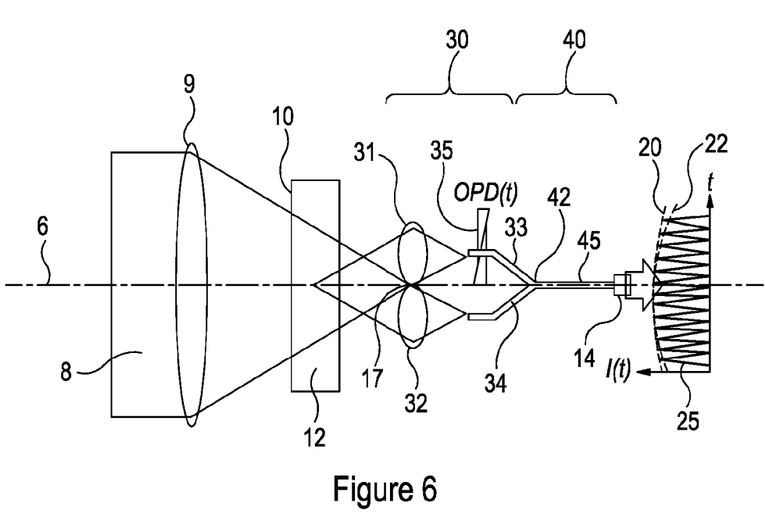
FIG. 6 is a schematic illustration of an interferometric particle sizing arrangement according to a second alternative embodiment.

FIG. 6 shows a second alternative embodiment in which a focussing optical element 9 is positioned between the light source and sample cell 10. The focal point of the focussing optical element 9 is coincident with an optical beam dump 17. The focussing optical element 9 is configured to ensure that the light beam 8 is not incident on either the first optical system 30 or the second optical system 40. The first and second element 31, 32 thereby collect only scattered light for detection.

In this embodiment, the features of the interferometric particle sizing arrangement comprising the first optical system 30, second optical system 40 and detector 14 may be the same as in the embodiment illustrated in FIG. 5A, and any optional features may also apply to this embodiment.

Figure 7:
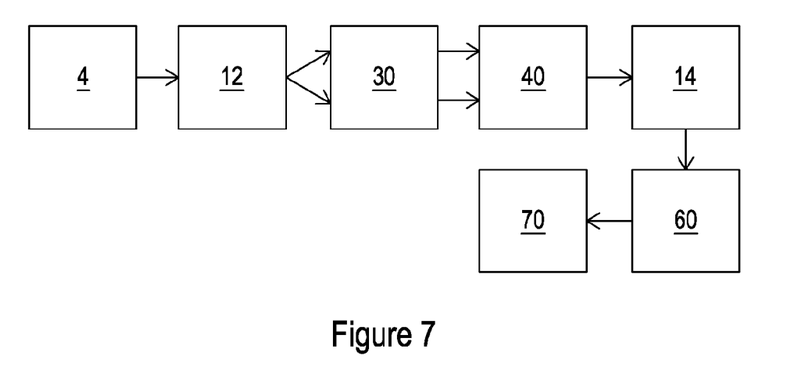
FIG. 7 is a schematic block diagram of a generalised interferometric particle sizing instrument.

FIG. 7 schematically illustrates a generalised instrument according to an embodiment, comprising a light source 4, sample holder 12, first optical system 30, second optical system 40, detector 14, processor 60 and optional display device 70.

The some embodiments, the instrument may comprise a data recording device and a feedback loop, coupled to the first optical system 30 and/or the second optical system 40, to determine if a response to an initial particle size distribution characterisation by an optical system of the instrument is required. For instance, if a significant component of the particle size distribution comprises particles with a size at, near to (e.g. within 50%), or less than the Rayleigh limit, the optical systems of the present disclosure may be preferentially used for analysis (e.g. in preference to a more classical, non-interferometric scattering detection arrangement). As noted above, a non-interferometric scattering detection arrangement may be produced by removal of the first optical system. A non-interferometric scattering detection arrangement may be used preferentially where an initial analysis indicates there are no particles with a size near to the Rayleigh limit.

If a Mie minima is detected on a particular detector channel, the optics of the present invention may be centred on the particular detector channel, for example, by adding optical depth to first optical element 31 and/or second optical element 32. The optical depth may be provided, for example, a variable depth optical wheel, a continuous Babinet compensator, or an alteration of the optical path difference, and hence a difference in phase, between the optical branch comprising optical fibre 33 and the optical branch comprising optical fibre 34 of embodiments comprising optical path length adjusters in one or both of the optical branches.

As already described above, the light source 6 illuminates the sample holder 12 with a light beam, producing scattered light from particles suspended in a sample that is on (e.g. in the case of a droplet) or in the sample holder 12. A first portion and a second portion of the scattered light are sampled by a first optical system, which transmits the first and second portion of scattered light to the second optical system by different optical paths. The second optical system causes the first and second portion of scattered light to be recombined to produce an interference pattern at the detector, due to the different optical paths of the first and second portion. The interference pattern, or an interference signal indicative of the interference pattern, is detected by the detector 14 (which may be a focal plane array detector, or a single detector in combination with a variable optical path difference between the first and second portion of scattered light).

The intensity of scattered light s at a number of different detection locations corresponding with different scattering angles is related to a vector q of particle frequency at each of a range of sizes by a scattering matrix A (which may be determined according to Mie scattering theory, see (W J. Wiscombe, Mie scattering calculations: advances in technique and fast vector-speed computer codes, NCAR technical note, August 1996):

$$s=Aq$$

To determine a particle size distribution from a vector of measured scattering intensities, it is possible to determine the particle size distribution using an inverted scattering matrix:

$$q=(A^TA)^{-1}A^Ts$$

In a system according to an embodiment, an additional transformation F is applied to the scattered light to account for the first and second optical system. The transformation matrix F may be determined by numerical simulation of the optics, for example using commercially available optical simulation software such as Zemax:

$$s=AFq$$

A combined scattering and optics matrix A' can be defined:

$$A'=AF$$

The particle size distribution may be then be determined from:

$$q=(A'^TA')^{-1}A'^Ts$$

In non-interferometric diffraction based particle size measurement instruments (e.g. Mastersizer 3000) the scattering process can be described using a scattering matrix $$x=Ab$$

where x is the vector of scattered light intensities at each detector channel, A is, in general, a non-square matrix and b is a particle size vector. The matrix describes the effect the particles have on the wavefront incident on the measurement cell. The goal is to calculate a PSD so we invert equation (1) and solve for b.

$$b=A^{-1}x$$

However, in the embodiments of the invention there are additional optical components between the measurement cell and the detector. One way to account for these additional components may be to define a new matrix A'=A+P, where P is the effect the extra optics have on the scattered light.

According to an embodiment, the processor 60 may therefore be configured to determine particle size and/or a particle size distribution from an interference signal.

The processor may be operable to display the particle size and/or particle size distribution on display 70, or to transmit data resulting from this analysis to a remote computer and/or to record the data to a machine readable storage medium.

Although the diagrams in this case illustrate a two dimensional array of sampling apertures for scattered light, it will be appreciated that this is for convenience of illustration, and this is not essential. In some embodiments, more than two portions of scattered light may be sampled and then recombined to produce the interference signal at the detector.

The invention claimed is:
1. A particle-sizing instrument comprising:
   a sample cell for receiving a sample comprising a plurality of particles;
   a light source configured to illuminate the sample with a light beam to produce scattered light by the interaction of the light beam with the particles;

a first optical system comprising a first and second optical element respectively configured to split a portion of the scattered light into a first and second portion of scattered light;

a second optical system configured to receive the first and second portion of scattered light from the first optical system, and to recombine the first and second portion of scattered light to produce an interference signal at a detection location;

a detector configured to detect the interference signal at the detection location; and a processor configured to receive measurement data from the detector indicative of the interference signal at the detection location, and to determine a particle size and/or a particle size distribution from the measurement data.

2. The instrument of claim 1, further comprising an optical path adjuster, for varying a first optical path taken by the first portion of scattered light to the detector, relative to a second optical path taken by the second portion of scattered light to the detector, so as to vary the interference signal at the detection location.

3. The instrument of claim 2, wherein the optical path adjuster is configured to adjust a position of the first optical element relative to a position of the second optical element.

4. The instrument of claim 2, wherein the optical path adjuster is configured to adjust an optical path length for the first portion of scattered light to the second optical system, relative to an optical path length for the second portion of scattered light to the second optical system.

5. The instrument of claim 1, wherein the first optical element comprises an input aperture of a first optical fibre, and the second optical element comprises an input aperture of a second optical fibre.

6. The instrument of claim 5, wherein the second optical system comprises a coupler for joining the first and second optical fibres, so as to combine the first and second portions of scattered light within a length of optical fibre.

7. The instrument of claim 1, wherein the detector comprises an avalanche photodiode.

8. The instrument of claim 1, wherein the detector comprises an array of detector elements arranged in a detector focal plane.

9. The instrument of claim 1, wherein:
the first element of the first optical system is configured to receive a first portion of the scattered light and to modify the convergence of the first portion of scattered light communicated to the second optical system;
the second element of the first optical system is configured to receive a second portion of the scattered light and to modify the convergence of the second portion of scattered light communicated to the second optical system.

10. The instrument of claim 9, wherein the first and second element each comprise a converging refractive lens element.

11. The instrument of claim 1, wherein the first and second element are symmetric about the illuminating light beam.

12. The instrument of claim 1, wherein:
(i) the second optical system comprises a converging refractive lens element with a focal plane that is co-incident with the detection location; or
(ii) the second optical system comprises a converging reflecting element with a focal plane that is co-incident with the detection location.

13. The instrument of claim 1, wherein determining particle size comprises using an inverted scattering matrix obtained according to Mie scattering theory, the inverted scattering matrix relating an intensity of scattered light at a plurality of different scattering angles to a distribution of particles at a plurality of different sizes.

14. The instrument of claim 13, wherein determining particle size comprises obtaining an inversion matrix from a combination of an inverted scattering matrix and an optics matrix, the optics matrix representing the transformation of the scattered light by the first and second optical system.

15. The instrument of claim 1, wherein the light source comprises a laser or an LED.

16. The instrument of claim 1, wherein at least one of the first or second element is mounted on a motorised stage.

17. The instrument of claim 1, wherein the instrument is configurable to function as either an interferometer or a conventional non-interferometric light scattering instrument by moving at least some elements of the first and/or second optical system into and out of the optical path of scattered light between the sample and the detector.

18. A method of obtaining a particle size or particle size distribution from a sample comprising particles suspended in a fluid, comprising:
illuminating the sample with a light beam, thereby producing scattered light from the interaction of the light beam with the particles;
splitting a portion of the scattered light into a first and second portion of scattered light;
recombining the first and second portion of scattered light at a detection focal plane to produce an interference pattern at the detection focal plane;
detecting the interference pattern at the focal plane;
processing the detected interference pattern to determine a particle size or particle size distribution.

19. The method of claim 18, wherein the splitting is performed by a first optical system comprising:
a first element configured to define a first aperture corresponding with the first portion of the scattered light;
a second element configured to define a second aperture corresponding with the second portion of the scattered light.

20. The method of claim 19, wherein:
the first optical element comprises an input aperture of a first optical fibre, and the second optical element comprises an input aperture of a second optical fibre; and/or
the first optical element comprises a first refracting converging lens; and the second optical element comprises a second refracting converging lens.

* * * * *